United States Patent
Sato et al.

(10) Patent No.: US 7,933,459 B2
(45) Date of Patent: Apr. 26, 2011

(54) DATA PROCESSING APPARATUS, THE METHOD AND CODING APPARATUS

(75) Inventors: Kazushi Sato, Chiba (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 883 days.

(21) Appl. No.: 10/591,234

(22) PCT Filed: Feb. 25, 2005

(86) PCT No.: PCT/JP2005/003151
§ 371 (c)(1),
(2), (4) Date: Aug. 31, 2006

(87) PCT Pub. No.: WO2005/086492
PCT Pub. Date: Sep. 15, 2005

(65) Prior Publication Data
US 2007/0140576 A1      Jun. 21, 2007

(30) Foreign Application Priority Data
Mar. 3, 2004   (JP) .................................. 2004-059649

(51) Int. Cl.
*G06K 9/36*      (2006.01)
*G06K 9/46*      (2006.01)
*H04B 1/66*      (2006.01)
*H04N 11/02*     (2006.01)
*H04N 11/04*     (2006.01)
*H04N 7/12*      (2006.01)

(52) U.S. Cl. ..................... 382/239; 382/232; 375/240.03

(58) Field of Classification Search .................. 382/232, 382/239, 251; 375/240.03
See application file for complete search history.

(56) References Cited

U.S. PATENT DOCUMENTS

| 5,657,015 | A  | 8/1997 | Nakajima et al. |
|---|---|---|---|
| 6,005,623 | A  | 12/1999 | Takahashi et al. |
| 6,426,974 | B2 | 7/2002 | Takahashi et al. |
| 6,587,508 | B1 * | 7/2003 | Hanamura et al. ........ 375/240.24 |
| 6,687,296 | B1 * | 2/2004 | Sato et al. ................ 375/240.12 |
| 6,714,592 | B1 * | 3/2004 | Liu et al. .................. 375/240.13 |
| 6,915,018 | B2 | 7/2005 | Tajime |
| 7,106,799 | B1 * | 9/2006 | Sostawa et al. .......... 375/240.24 |
| 7,116,835 | B2 | 10/2006 | Takahashi et al. |
| 2001/0006562 | A1 | 7/2001 | Tajime |

(Continued)

FOREIGN PATENT DOCUMENTS

EP    0 509 576 A2    10/1992

(Continued)

OTHER PUBLICATIONS

Japanese Office Action issued on Mar. 9, 2010 in counterpart Japanese Application No. 2004-059649, 3 pages.

(Continued)

*Primary Examiner* — Samir A Ahmed
*Assistant Examiner* — Li Liu
(74) *Attorney, Agent, or Firm* — Finnegan, Henderson, Farabow, Garrett & Dunner, L.L.P.

(57) ABSTRACT

From an MPEG image data (S11), an MPEG2 encoder circuit (51) extracts a quantum scale (Qm) of each macro block (MB) which has been used for quantization of the MPEG2 in the encoding process. An activity calculation circuit (53) calculates an activity (Nact), based on the quantum scale (Qm), A rate control circuit (54) calculates a quantization parameter (QP) for each macro block (MB), based on the activity (Nact).

18 Claims, 10 Drawing Sheets

U.S. PATENT DOCUMENTS

| | | | |
|---|---|---|---|
| 2002/0126752 A1* | 9/2002 | Kim | 375/240.03 |
| 2002/0136295 A1* | 9/2002 | Sato | 375/240.03 |
| 2003/0067979 A1 | 4/2003 | Takahashi et al. | |
| 2005/0152449 A1* | 7/2005 | Nemiroff et al. | 375/240.03 |
| 2007/0053427 A1* | 3/2007 | Henocq | 375/240 |

FOREIGN PATENT DOCUMENTS

| | | |
|---|---|---|
| EP | 0 687 112 A3 | 12/1995 |
| EP | 1 104 198 A1 | 5/2001 |
| JP | 7-107461 A | 4/1995 |
| JP | 8-84339 A | 3/1996 |
| JP | 8-111870 A | 4/1996 |
| JP | 8-251587 A | 9/1996 |
| JP | 2001-186517 A | 7/2001 |
| JP | 2002-44668 A | 2/2002 |
| JP | 2003-37843 A | 2/2003 |
| JP | 2003-244706 A | 8/2003 |
| WO | WO 97/47128 A2 | 12/1997 |

OTHER PUBLICATIONS

Supplemental European Search Report dated Sep. 24, 2010 in European Application No. 05710701, 3 pages.

* cited by examiner

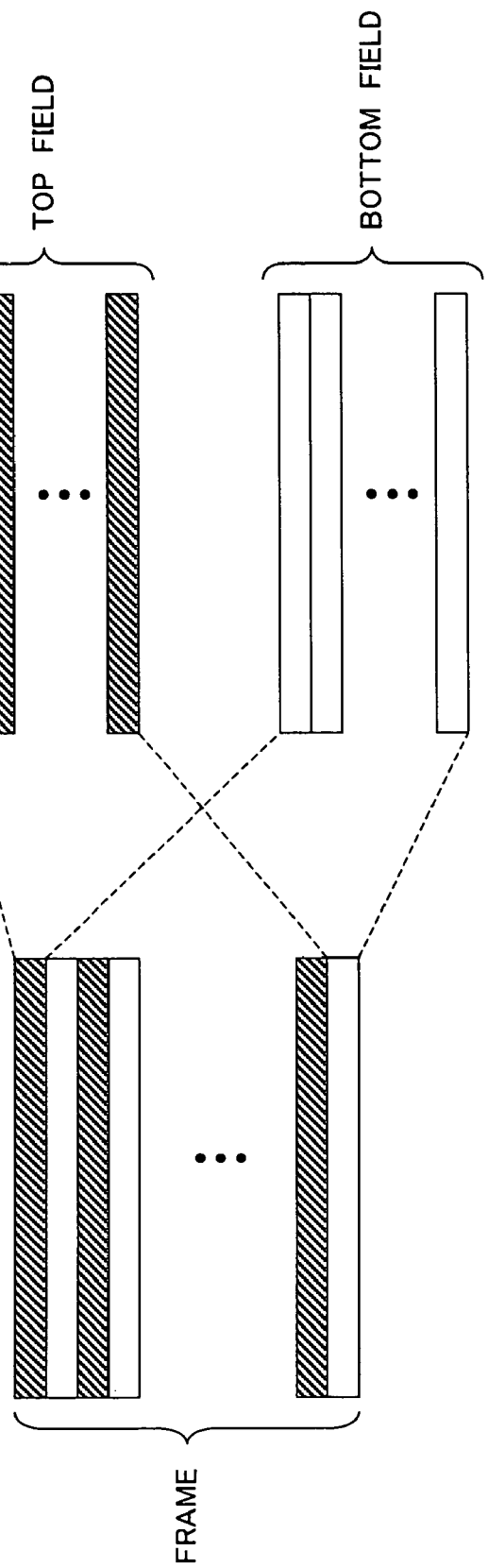

WHEN PERFORMING FIELD CODING IN UNIT OF PICTURE

WHEN PERFROMING FIELD CODING
IN UNIT OF MACRO BLOCK

DATA PROCESSING APPARATUS, THE METHOD AND CODING APPARATUS

TECHNICAL FIELD

The present invention relates to a data processing apparatus, the method and a coding apparatus for performing quantization on image data.

BACKGROUND ART

In recent years, apparatuses based on methods, such as the Moving Picture Experts Group (MPEG) for using image data as digital and compressing by discrete cosine transformation and other orthogonal transformations and motion compensation by using redundancy peculiar to image information for the purpose of efficiently transferring and accumulating information, have been widespread both in information distribution by broadcast stations and in information receiving by general households. In the MPEG method, transformation coefficients are generated by performing orthogonal transformation on image data to be coded and quantization is performed on the transformation coefficients by a predetermined quantization scale, and then the quantized image data are coded.

In the MPEG method, the quantization scale is determined based on a degree of complexity of an image to be coded, so that the more complex the image becomes, the smaller the value becomes.

Following to the MPEG method, coding methods called the H.264 and JVT (Joined Video Team) for realizing a still higher compression rate have been proposed.

In the JVT method coding apparatus, coding in the JVT method is performed after decoding image data coded by the MPEG in some cases.

DISCLOSURE OF THE INVENTION

Problems to be Solved by the Invention

When performing quantization without considering a quantization scale used in the MPEG method coding apparatus in the JVT method coding apparatus of the related art explained above, there is a disadvantage that, for example, an extremely larger quantization scale than the quantization scale used in the MPEG method coding apparatus is selected and information held by the MPEG method is lost by rough quantization, so that the image quality is deteriorated in some cases.

Inversely, there is a disadvantage in the JVT method coding apparatus of the related art explained above that an extremely smaller quantization scale than the quantization scale used in the MPEG method coding apparatus is selected and a large number of bits are assigned to less information, so that the coding efficiency declines without improving the image quality.

The same disadvantages may arise also in coding methods other than the MPEG method and the JVT method.

It is desired to provide a data processing apparatus, the method and a coding apparatus for, when performing second quantization on data to be processed and obtained by performing inverse quantization after performing first quantization, suitably performing the above second quantization in terms of image quality and a coding efficiency.

Means of Solving the Problems

To solve the above disadvantages of the related art explained above, according to a first invention, there is provided a data processing apparatus for performing a second quantization on data to be processed and obtained by performing inverse quantization after performing a first quantization by a first quantization scale, comprising a quantization scale generation means for generating a second quantization scale based on the first quantization scale; and a quantization means for performing the second quantization on the data to be processed based on the second quantization scale generated by the quantization scale generation means.

An operation of the data processing apparatus of the first invention is as below.

First, the quantization scale generation means generates the second quantization scale based on the first quantization scale, Next, the quantization means performs the second quantization on the data to be processed based on the second quantization scale generated by the quantization scale generation means.

According to a second invention, there is provided a data processing method for performing the second quantization on data to be processed and obtained by performing inverse quantization after performing the first quantization by the first quantization scale, including: a first step of generating a second quantization scale based on the first quantization scale; and a second step of performing the second quantization on the data to be processed based on the second quantization scale generated in the first step.

According to a third invention, there is provided a coding apparatus, comprising a decoding means for generating decoding data by decoding coding data generated by performing coding on motion image data by the first coding method and obtained by performing the first quantization based on the first quantization scale in the coding step; the quantization scale generation means for generating the second quantization scale based on the first quantization scale; and a quantization means for performing second quantization on the decoding data based on the second quantization scale generated by the quantization scale generation means in a step of performing coding in a second coding method which is different from the first coding method on the decoding data generated by the decoding means.

An operation of the coding apparatus of the third invention is as below.

First, a decoding means generates decoding data by decoding coding data generated by performing coding on moving image data by the first coding method and obtained by performing the first quantization based on the first quantization scale in the above coding step.

Next, the quantization scale generation means generates the second quantization scale based on the first quantization scale.

Next, the quantization means performs the second quantization on the decoding data based on the second quantization scale generated by the quantization scale generation means in a step of coding the decoding data generated by the decoding means by a second coding method which is different from the first coding method.

According to a fourth invention, there is provided a data processing apparatus for performing the second quantization on data to be processed and obtained by performing the inverse quantization after performing the first quantization by the first quantization scale, comprising the quantization scale generation circuit for generating a second quantization scale based on the first quantization scale; and the quantization circuit for performing the second quantization on the data to be processed based on the second quantization scale generated by the quantization scale generation circuit.

EFFECT OF THE INVENTION

According to the present invention, when performing second quantization on data to be processed and obtained by performing inverse quantization after performing the first quantization, it is possible to provide a data processing apparatus, the method and a coding apparatus for suitably performing the second quantization in terms of image quality and a coding efficiency.

BRIEF DESCRIPTION OF DRAWINGS

FIG. 4A and FIG. 4B are views for explaining frame coding and field coding in unit of picture used in the JVT method;

EXPLANATION OF REFERENCE

1 . . . COMMUNICATION SYSTEM, 2 . . . CODING APPARATUS, 3 . . . DECODING APPARATUS, 22 . . . A/D CONVERSION CIRCUIT, 23 . . . PICTURE RELOCATING CIRCUIT, 24 . . . CALCULATION CIRCUIT, 25 . . . ORTHOGONAL TRANSFORMATION CIRCUIT, 26 . . . QUANTIZATION CIRCUIT, 27 . . . REVERSIBLE (LOSSLESS) CODING CIRCUIT, 28 . . . BUFFER, 29 . . . INVERSE QUANTIZATION CIRCUIT, 30 . . . INVERSE ORTHOGONAL TRANSFORMATION CIRCUIT, 31 . . . RESTRUCTURING CIRCUIT, 32 . . . DEBLOCK FILTER, 33 . . . MEMORY, 41 . . . INTRA PREDICTION CIRCUIT, 42 . . . MOTION PREDICTION/COMPENSATION CIRCUIT, 51 . . . MPEG2 DECODING CIRCUIT, 52 . . . PICTURE TYPE BUFFER, 53 . . . ACTIVITY CALCULATION CIRCUIT, 54 . . . RATE CONTROL CIRCUIT

BEST MODE FOR CARRYING OUT THE INVENTION

Below, a JVT method coding apparatus according to embodiments of the present invention will be explained.

First Embodiment

In the present embodiment, a JVT method coding apparatus will be explained with reference to FIG. 1 to FIG. 9.

First, corresponding relationship of components of the present invention and components of the present embodiment will be explained.

In the present embodiment, a function of generating a quantization scale based on a quantization parameter QP among functions of an activity calculation circuit 53, a rate control circuit 54 and a quantization circuit 26 corresponds to a quantization scale generation means of the first and third inventions.

Also, a function of performing quantization based on the quantization scale in functions of the quantization circuit 26 in the present embodiment corresponds to a quantization means of the first and third inventions.

Also, an MPEG2 decoding circuit 51 in the present embodiment corresponds to a decoding means of the third invention.

Figure 1:
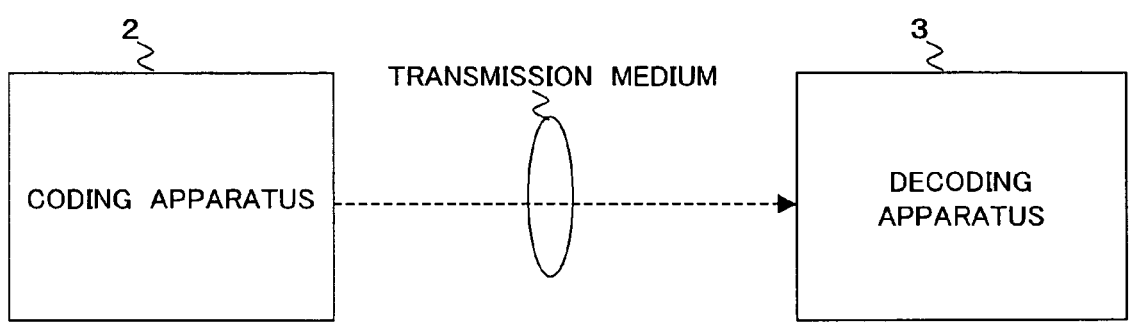
FIG. 1 is a view of the configuration of a communication system according to a first embodiment of the present invention.

FIG. 1 is a conceptual view of a communication system 1 of the present embodiment.

As shown in FIG. 1, the communication system 1 has a coding apparatus 2 provided on the transmission side and a decoding apparatus 3 provided on the receiving side.

In the communication system 1, in the coding apparatus 2 on the transmission side, after generating frame image data (bit stream) compressed by orthogonal transformation, such as discrete cosine transformation and Karhunen-Loeve transformation, and motion compensation and modulating the frame image data, it is transmitted via transmission media, such as a satellite broadcast wave, a cable TV network, a telephone line network and a cellular phone network.

On the receiving side, after decoding a received image signal, frame image data decompressed by inverse transformation of the orthogonal transformation at the time of the above modulation and motion compensation is generated and used.

Note that the transmission media may be recording media, such as an optical disk, a magnetic disk and a semiconductor memory.

A decoding apparatus 3 shown in FIG. 1 performs decoding in accordance with coding by the coding apparatus.

Below, the coding apparatus 2 shown in FIG. 1 will be explained.

Figure 2:
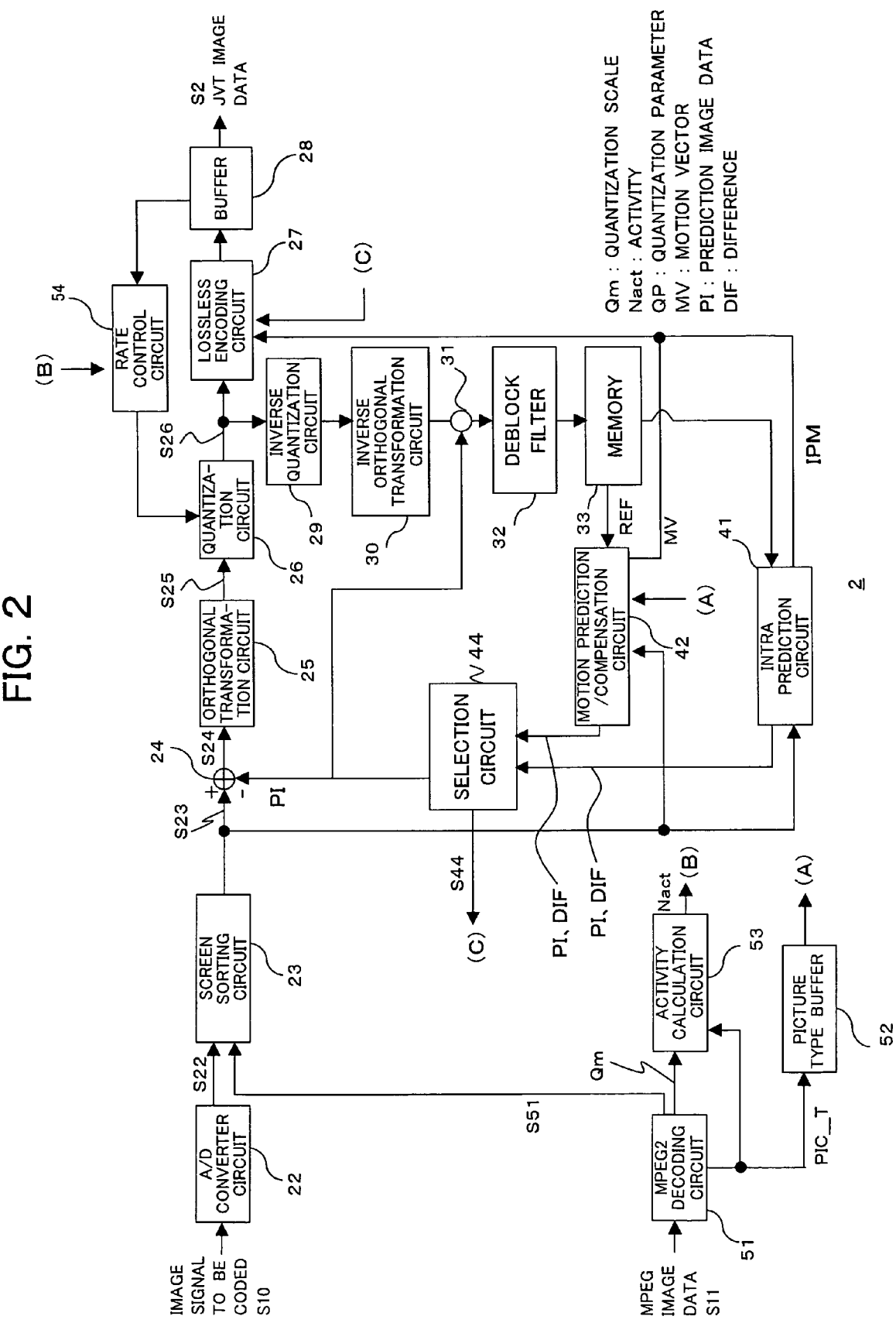
FIG. 2 is a functional block diagram of a coding apparatus shown in FIG. 1.

FIG. 2 is a view of the overall configuration of the coding apparatus 2 shown in FIG. 1.

As shown in FIG. 2, the coding apparatus 2 includes, for example, an A/D conversion circuit 22, a picture relocating circuit 23, a calculation circuit 24, an orthogonal transformation circuit 25, a quantization circuit 26, a reversible coding circuit 27, a buffer 28, an inverse quantization circuit 29, an inverse orthogonal transformation circuit 30, a restructuring circuit 31, a deblock filter 32, a memory 33, an intra prediction circuit 41, a motion prediction/compensation circuit 42, a selection circuit 44, an MPEG2 decoding circuit 51, a picture type buffer memory 52, an activity calculation circuit 53 and a rate control circuit 54.

Below, an outline of the coding apparatus 2 will be explained.

In the coding apparatus 2, an MPEG image data S11 coded by the MPEG2 in the MPEG2 decoding circuit 51 is decoded to generate image data S51, and the image data S51 is coded by the JVT method.

The MPEG2 decoding circuit 51 extracts a quantization scale Qm (first quantization scale of the present invention) of each macro block MB used in quantization in the MPEG2 coding step (first quantization of the present invention) from the MPEG image data S11 and outputs to the activity calculation circuit 53.

The activity calculation circuit 53 calculates an activity "Nact" based on the quantization scale Qm and outputs the same to the rate control circuit 54 as will be explained later on.

The rate control circuit 54 calculates a quantization parameter QP of each macro block MB based on the activity "Nact" input from the activity calculation circuit 53 and outputs the same to the quantization circuit 26.

The quantization circuit 26 performs quantization (the second quantization of the present invention) on the image data S25 by using a quantization scale (the second quantization scale of the present invention) determined based on the quantization parameter QP input from the rate control circuit 54.

Next, MPEG2 and JVT coding methods will be explained.

In either of the MPEG2 and JVT, there are non-interlace scanning image data and interlace scanning image data in image data input to the coding apparatus, and it is possible to select coding in unit of field data (field coding) and coding in unit of frame data (frame coding).

Figures 3A, 3B:
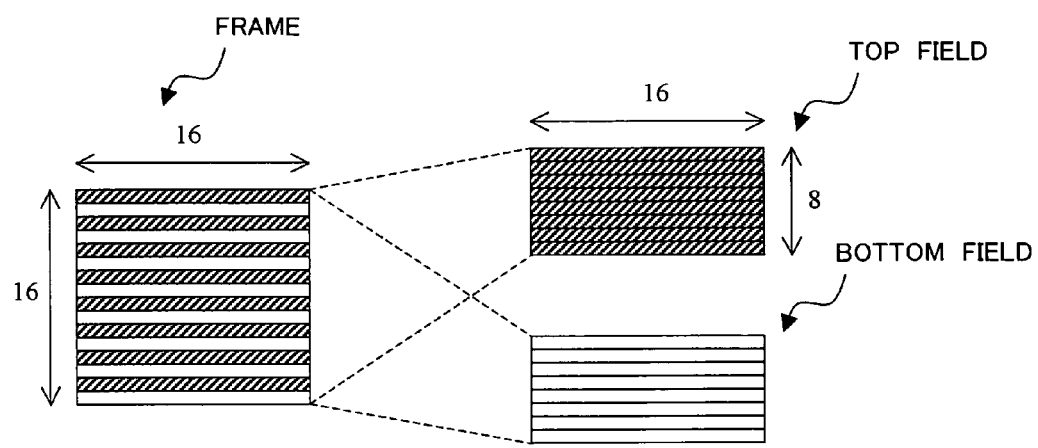
FIG. 3A and FIG. 3B are views for explaining frame coding and field coding used in the MPEG2 method.

In the MPEG2, frame coding may be performed on a macro block MB composed of data of 16 pixels by 16 pixels, for example, as shown in FIG. 3A, or field coding may be performed on each top field data and bottom field data by dividing to data of 16 pixels by 8 pixels as shown in FIG. 3B.

Figure 5:
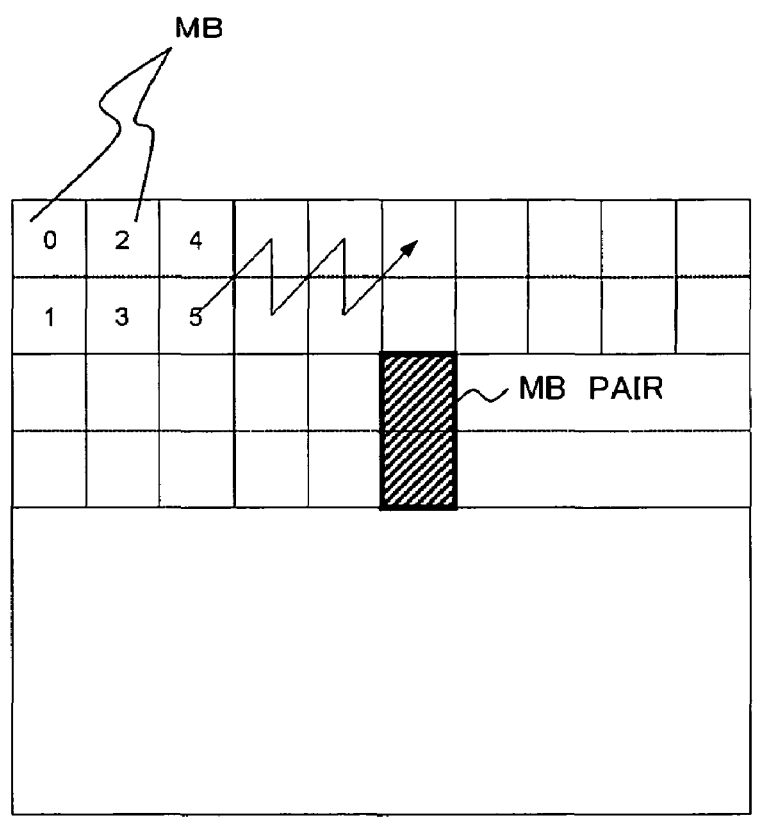
FIG. 5 is a view for explaining frame coding and field coding in unit of macro block used in the JVT method.

Also, in the JVT, it is possible to select coding in unit of picture as shown in FIG. 4A and FIG. 4B and coding in unit of macro block as shown in FIG. 5.

As coding in unit of picture, it is possible to select frame coding shown in FIG. 4A and field coding shown in FIG. 4B.

Also, as coding in unit of macro block, it is possible to select the case of performing frame coding or field coding in unit of single macro block and the case of performing frame coding or field coding in unit of two macro blocks MB (MB pair), that is data of 16 pixels by 32 pixels.

Figure 6:
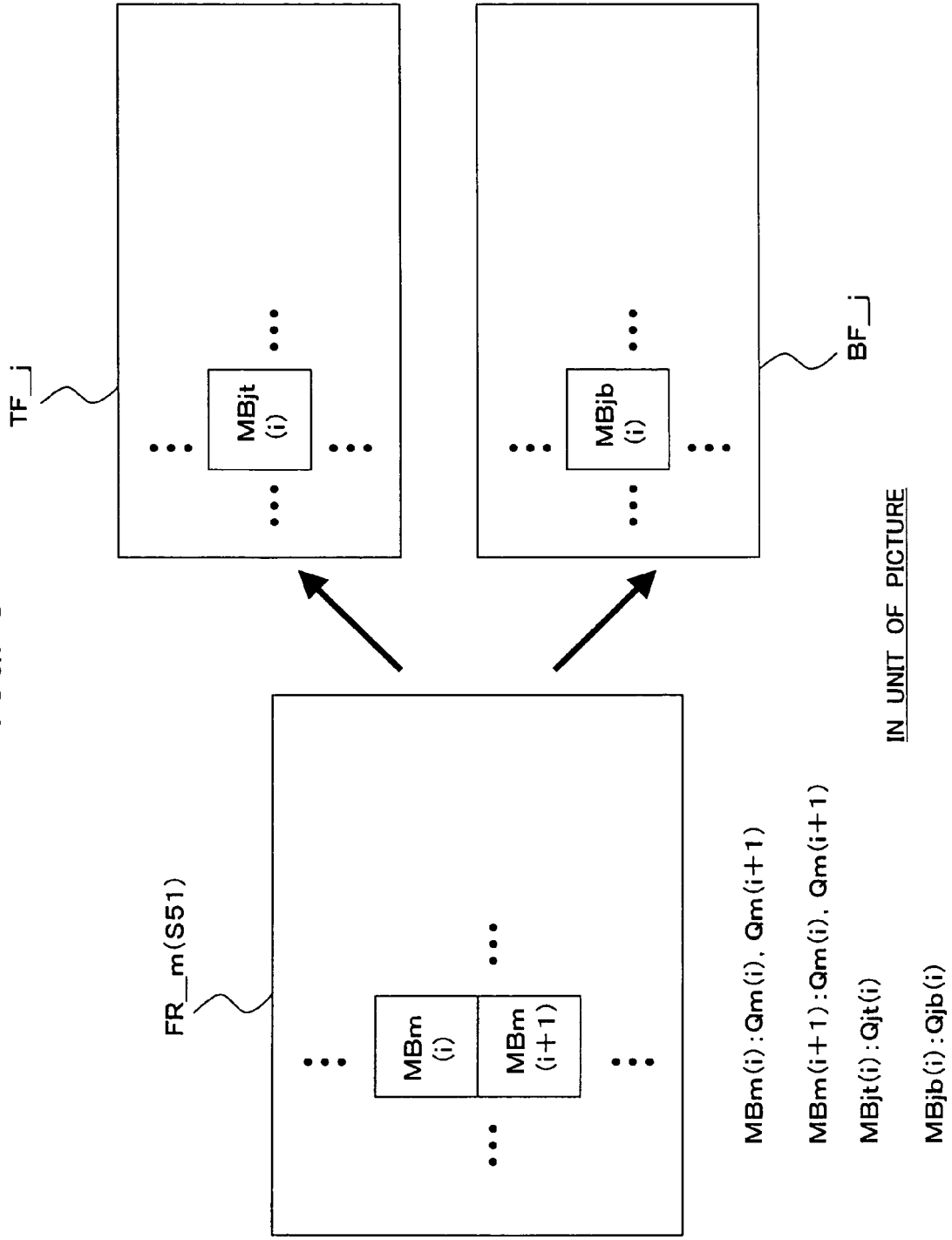
FIG. 6 is a view for explaining processing of performing field coding on MPEG image data in unit of picture in the JVT method.

Also, in the present embodiment, as shown in FIG. 6, respective macro blocks MB(i) and MB(i+1) adjacent in the vertical direction in frame data FR_m composing the image data S51 obtained by decoding in the MPEG2 decoding circuit 51 are quantized based on quantization scales Qm(i) and Qm(i+1), respectively, in MPEG coding performed in the past.

The MPEG2 decoding circuit 51 extracts the quantization scales Qm(i) and Qm(i+1) in the step of decoding the MPEG image data S11 and outputs to the activity calculation circuit 53.

Note that each of the macro blocks MB in the MPEG image data S11 corresponding to the macro blocks MB(i) and MB(i+1) includes both of the quantization scales Qm(i) and Qm(i+1).

Also, when field coding in unit of picture by the JVT method is performed, JVT image data S2 includes in a macro block MBjt(i) in a top field TF_j corresponding to a macro block MBm(i) a quantization scale Qjt(i) used in the quantization as shown in FIG. 6. Also, in a macro block MBjb(i) in a bottom field BF_j corresponding to a macro block MBm(i+1), a quantization scale Qjb(i) used in the quantization is included.

Figure 7:
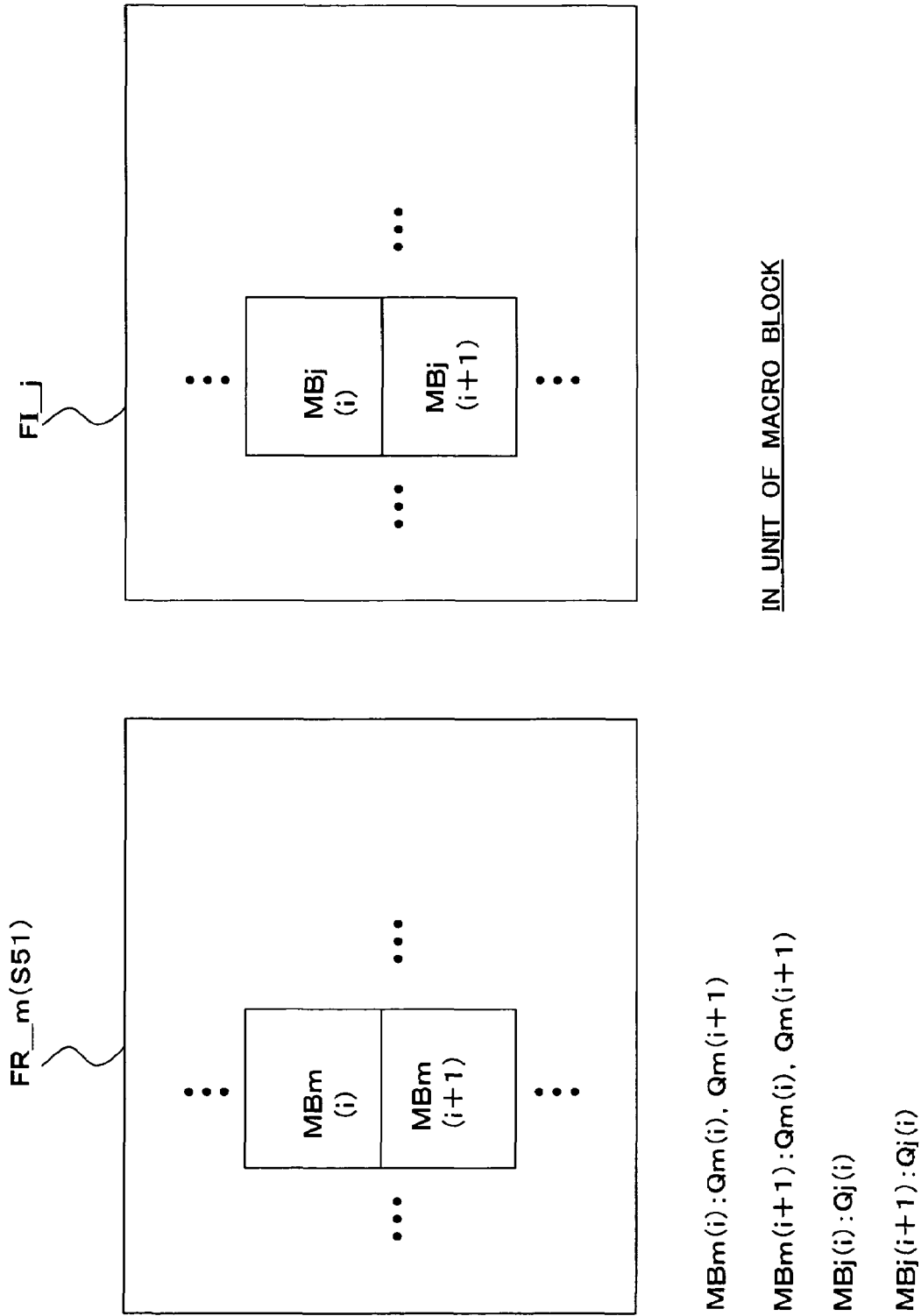
FIG. 7 is a view for explaining processing for performing field coding on MPEG image data in unit of macro block in the JVT method.

On the other hand, furthermore, when field coding in unit of macro block pair by the JVT method is performed, in JVT image data S2, as shown in FIG. 7, a macro block MBj(i) corresponding to the macro block MBm(i) and a macro block MBj(i+1) corresponding to the macro block MBm(i+1) are arranged in the same field FI_j.

The macro block MBj(i) includes a quantization scale Qj(i) used in the quantization, and the macro block MBj(i+1) includes a quantization scale Qj(i+1) used in the quantization.

Below, components of the coding apparatus 2 will be explained.

The A/D conversion circuit 22 converts image data S10 to be coded and composed of input analog luminance signal Y and color-difference signals Pb and Pr to image data S22 in digital, and outputs the same to the picture relocating circuit 23.

The screen relocating circuit 23 outputs image data S23 obtained by relocating image data S22 input from the A/D conversion circuit 22 or image data S51 input from the MPEG2 decoding circuit 51 in an order of coding in accordance with the GOP (group of pictures) structure composed of the picture types I, P and B to the calculation circuit 24, the intra prediction circuit 41 and the motion prediction/compensation circuit 42.

Below, in the present embodiment, the case where the screen relocating circuit 23 performs processing on image data S51 input from the MPEG2 decoding circuit 51.

The calculation circuit 24 generates image data S24 indicating a difference between the image data S23 and prediction image data PI input from a selection circuit 44 and outputs the same to the orthogonal transformation circuit 25.

The orthogonal transformation circuit 25 performs orthogonal transformation, such as discrete cosine transformation and Karhunen-Loeve transformation, on the image data S24 to generate image data (for example, a DCT coefficients) S25 and outputs the same to the quantization circuit 26.

The quantization circuit 26 performs quantization on the image data S25 based on the quantization scale regulated based on the quantization parameter QP input from the rate control circuit 32 and in accordance with the quantization parameter QP to generate image data S26 and outputs the same to the reversible coding circuit 27 and inverse quantization circuit 29.

The reversible coding circuit 27 stores in the buffer 28 image data obtained by performing variable length coding or calculation coding on the image data S26.

At this time, when the selection data S44 indicates that inter prediction coding is selected, the reversible coding circuit 27 performs coding on a motion vector MV input from the motion prediction/compensation circuit 58 and stores the same in the header data.

Alternately, when selection data S44 indicates that intra prediction coding is selected, the reversible coding circuit 27 stores an intra prediction mode IPM input from the intra prediction circuit 41 in the header data, etc.

Also, the reversible coding circuit 27 makes the quantization scale used in quantization in the quantization circuit 26 included in respective macro blocks MB.

Image data stored in the buffer 28 is transmitted after being modulated, etc.

The inverse quantization circuit 29 performs inverse quantization on the image data S26 based on the quantization scale used in the quantization circuit 26 and outputs the same to the inverse orthogonal transformation circuit 30.

The inverse orthogonal transformation circuit 30 performs inverse orthogonal transformation corresponding to the orthogonal transformation used in the orthogonal transformation circuit 25 on inversely quantized image data input from the inverse quantization circuit 29 and outputs the same to the restructuring circuit 31.

The restructuring circuit 31 adds prediction image data PI input from the selection circuit 44 and image data input from the inverse orthogonal transformation circuit 30 to generate restructuring image data and outputs the same to the deblock filter 32.

After eliminating block strain of image data input from the restructuring circuit 31, the deblock filter 32 writes the same as reference image data in the memory 33.

The intra prediction circuit 41 performs intra prediction coding on the respective macro blocks MB composing image data read from the memory 33 to generate prediction image data, for example, based on respective intra prediction modes regulated in advance by the JVT and detects a difference DIF between the prediction image data and the image data S23.

Then, the intra prediction circuit 41 specifies an intra prediction mode corresponding to the minimum difference in the above difference generated respectively for the above plurality of intra prediction modes and outputs the specified intra prediction mode IPM to the reversible coding circuit 27.

Also, the intra prediction circuit 41 outputs the prediction image data PI by the specified intra prediction mode and the difference DIF to the selection circuit 44.

The motion prediction/compensation circuit 42 performs motion prediction processing in unit of frame data and field data on the image data S23 as explained with reference to FIG. 4 and FIG. 5 and determines a motion vector MV based on the reference image data REF read from the memory 33.

Namely, the motion prediction/compensation circuit 42 determines a motion vector MV to make the difference DIF between prediction image data PI regulated by the motion vector MV and the reference image data REF and the image data S23 minimum.

The motion prediction/compensation circuit 42 outputs the prediction image data PI and the difference DIF to the selection circuit 44 and outputs the motion vector MV to the reversible coding circuit 27.

Note that the motion prediction/compensation circuit 42 performs motion prediction/compensation processing on the respective frame data and field data based on picture type data PIC_T read from the picture type buffer memory 52 by applying the same picture type used in the MPEG coding.

The selection circuit 44 compares the difference DIF input from the intra prediction circuit 41 and the difference DIF input from the motion prediction/compensation circuit 42.

When the selection circuit 44 determines that the difference DIF input from the intra prediction circuit 41 is smaller from the above comparison, it selects the prediction image data PI input from the intra prediction circuit 41 and outputs to the calculation circuit 24.

When the selection circuit 44 determines that the difference DIF input from the motion prediction/compensation circuit 42 is smaller from the above comparison, it selects the prediction image data PI input from the motion prediction/compensation circuit 58 and outputs to the calculation circuit 24.

Also, the selection circuit 44 outputs to the reversible coding circuit 27 selection data S44 indicating that inter prediction coding is selected when the prediction image data PI input from the intra prediction circuit 41 is selected, while outputs to the reversible coding circuit 27 selection data S44 indicating that intra prediction coding is selected when the prediction data PI input from the motion prediction/compensation circuit 58 is selected.

The MPEG2 decoding circuit 51 receives as an input, for example, MPEG image data S11, and decodes the MPEG image data S11 by the MPEG2 to generate image data S51 and outputs the same to the screen relocating circuit 23.

Also, the MPEG2 decoding circuit 51 writes in the picture type buffer memory 52 the picture type data PIC_T included in a header of the image data S11 and indicating a picture kind of each macro block.

The MPEG2 decoding circuit 51 extracts a quantization scale Qm of the each macro block used in the quantization in the MPEG2 coding step from the MPEG image data S11 in the above decoding and outputs to the activity calculation circuit 53.

The picture type data PIC_T stored in the picture type buffer memory 52 is read by the selection circuit 44 and the motion prediction/compensation circuit 58.

Figure 8:
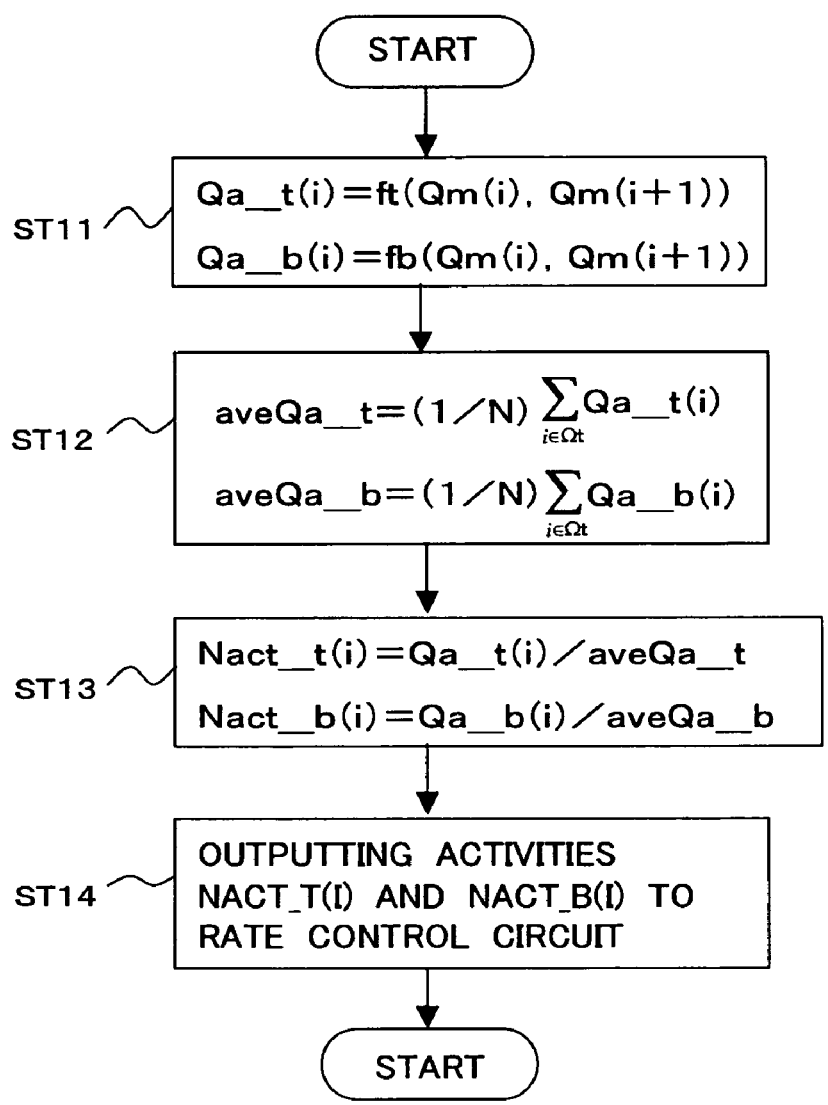
FIG. 8 is a view for explaining processing in an activity calculation circuit shown in FIG. 2 when performing field coding in unit of picture as shown in FIG. 6 in the coding apparatus 2 shown in FIG. 2.

The activity calculation circuit 53 calculates an activity Nact based on the quantization scale Qm input from the MPEG2 decoding circuit 51 and outputs the same to the rate control circuit 54. FIG. 8 is a view for explaining processing in the activity calculation circuit 53 shown in FIG. 2 when performing field coding in unit of picture as shown in FIG. 6 in JVT coding.

Below, an explanation will be made by taking as an example calculation of the activity Nact used for generating macro blocks MBjt(i) and MBjb(t) in the JVT image data S2 shown in FIG. 6.

Step ST11:

The activity calculation circuit 53 receives as an input a quantization scale Qm(i) of the macro block MBm(i) and a quantization scale Qm(i+1) of a macro block MBm(i+1) shown in FIG. 6 from the MPEG2 decoding circuit 51.

The activity calculation circuit 53 receives as an input the quantization scales Qm(i) and Qm(i+1) as arguments of a function ft( ) shown in the formula (1) below regulated in advance for a top field TF_j and specifies a quantization scale Qa_t(i).

[Formula 1]

$$Qa\_t(i)=ft(Qm(i),Qm(i+1)) \quad (1)$$

The activity calculation circuit 53 receives as an input the quantization scales Qm(i) and Qm(i+1) as arguments of a function fb( ) shown in the formula (2) regulated in advance for a bottom field BF_j and specifies a quantization scale Qa_b(i).

[Formula 2]

$$Qa\_b(i)=fb(Qm(i),Qm(i+1)) \quad (2)$$

As the ft( ) and fb( ), for example as shown in the formula (3), the smaller of the quantization scales Qm(i) and Qm(i+1) is selected and used for a function for specifying the quantization scales Qa_t(i) and Qa_b(i).

[Formula 3]

$$Qa\_t(i)=Qa\_b(i)=\min(Qm(i),Qm(i+1)) \quad (3)$$

Note that as the functions ft( ) and fb( ), for example, a function for calculating the quantization scales Qa_t(i) and Qa_b(i) by calculation shown in the formula (4) below.

[Formula 4]

$$Qa\_t(i)=Qa\_b(i)=(Qm(i)+Qm(i+1)+1)/2 \quad (4)$$

Step ST12:

The activity calculation circuit 53 calculates an average value aveQa_t of quantization scales Qa_t(i) of all block data in the top field TF_j, to which the macro block MBjt(i) belongs, based on the formula (5) below.

[Formula 5]

$$aveQa\_t = (1/N) \sum_{i \in \Omega t} Qa\_t(i) \qquad (5)$$

Also, the activity calculation circuit 53 calculates an average value aveQa_b of quantization scales Qa_b(i) of all block data in the bottom field BF_j, to which the macro block MBjb(i) belongs, based on the formula (6) below.

[Formula 6]

$$aveQa\_b = (1/N) \sum_{i \in \Omega B} Qa\_b(i) \qquad (6)$$

Step ST13:

The activity calculation circuit 53 calculates activity Nact_t(i) by dividing the quantization scale Qa_t(i) calculated in the step ST11 by the average value aveQa_t calculated in the step ST12 for each of the macro blocks MB belonging to the top field TF_j as shown in the formula (7) below.

[Formula 7]

$$Nact\_t(i) = Qa\_t(i)/aveQa\_t \qquad (7)$$

Also, the activity calculation circuit 53 calculates activity Nact_b(i) by dividing the quantization scale Qa_b(i) calculated in the step ST11 by the average value aveQa_b calculated in the step ST12 for each of the macro blocks MB belonging to the bottom field BF_j as shown in the formula (8) below.

[Formula 8]

$$Nact\_b(i) = Qa\_b(i)/aveQa\_b \qquad (8)$$

Step ST14:

The activity calculation circuit 53 outputs the activities Nact_t(i) and Nact_b(i) calculated in the step ST13 to the rate control circuit 54.

The rate control circuit 54 calculates a quantization parameter QP for each macro block MB based on the activities Nact_t(i) and Nact_b(i) input from the activity calculation circuit 53 and outputs the same to the quantization circuit 26.

Here, when expressing the activities Nact_t(i) and Nact_b(i) by the activity Nact(i), a quantization parameter QP(i) of each macro block MB is expressed by the formulas (9) and (10) below. Note that "round" in the formula (9) indicates integer processing by rounding, and "QPr" in the formula (10) is a reference quantization parameter regulated by the JVT method, which is regulated for field data or frame data.

[Formula 9]

$$\Delta QP = round(\log_{1.12} Nact(i)) \qquad (9)$$

[Formula 10]

$$QP(i) = QPr + \Delta QP \qquad (10)$$

The rate control circuit 54 outputs a quantization parameter QP(i) generated as explained above to the quantization circuit 26.

The quantization circuit 26 performs quantization on the image data S25 by a quantization scale regulated in accordance with the quantization parameter QP(i) input from the rate control circuit 54 to generate image data S26.

Note that, in the present embodiment, the quantization scale is regulated to be doubled when the quantization parameter QP(i) increases by "6".

Figure 9:
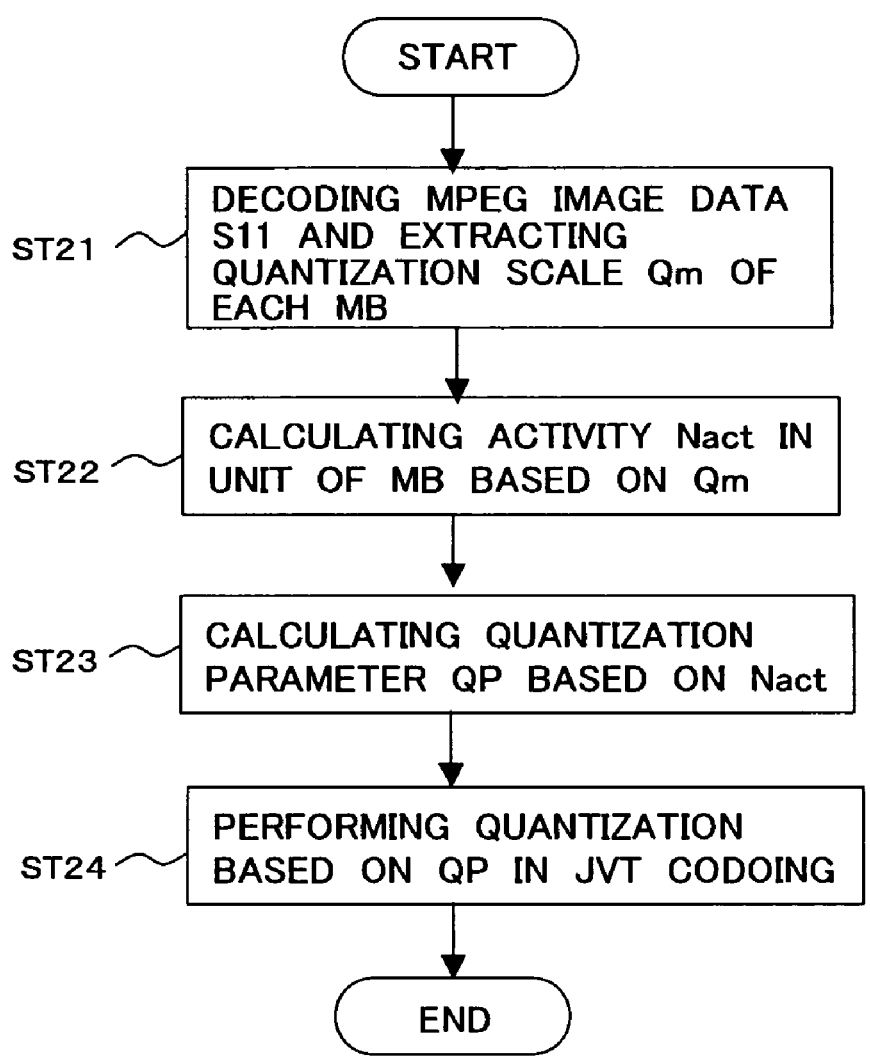
FIG. 9 is a view for explaining an operation example on determination of a quantization scale and quantization in the coding apparatus shown in FIG. 2.

FIG. 9 is a view for explaining an operation example of the coding apparatus 2 regarding determination of a quantization scale and quantization.

Step ST21:

The MPEG2 decoding circuit 51 extracts a quantization scale Qm of each macro block used in quantization in an MPEG2 coding step from the MPEG image data S11 in the decoding above and outputs to the activity calculation circuit 53.

Step ST22:

The activity calculation circuit 53 calculates activities Nact (Nact_t(i) and Nact_b(i)) based on the quantization scale Qm input from the MPEG2 decoding circuit 51 in the step ST21 and outputs the same to the rate control circuit 54.

Step ST23:

The rate control circuit 54 calculates a quantization parameter QP of each macro block MB based on the activity Nact input from the activity calculation circuit 53 in the step ST22 and outputs the same to the quantization circuit 26.

Step ST24:

The quantization circuit 26 performs quantization on the image data S25 by a quantization scale regulated in accordance with the quantization parameter QP(i) input from the rate control circuit 54 in the step ST23 to generate image data S26.

Below, an example of an overall operation of the coding apparatus 2 when coding by the JVT method the image data S51 obtained by decoding the MPEG image data S11 will be explained.

First, the MPEG image data S11 coded by the MPEG2 is input to the MPEG2 decoding circuit 51.

Next, the MPEG2 decoding circuit 51 decodes the MPEG image data S11 to generate the image data S51 and outputs the same to the screen relocating circuit 23.

At this time, the MPEG2 decoding circuit 51 extracts a quantization scale Qm of each macro block used in quantization in the MPEG2 coding step from the MPEG image data S11 in the above decoding and outputs the same to the activity calculation circuit 53.

Then, the activity calculation circuit 53 calculates an activity Nact based on the quantization scale Qm and outputs the same to the rate control circuit 54.

Then, the rate control circuit 54 calculates a quantization parameter QP of each macro block MB based on the activity Nact and outputs the same to the quantization circuit 26.

Also intra prediction is performed in the intra prediction circuit 41 and a difference DIF with the prediction image data PI is output to the selection circuit 44.

Also, in the motion prediction/compensation circuit 42, motion prediction/compensation processing is performed and a motion vector MV is specified, and the prediction image data PI and the difference DIF are output to the selection circuit 44.

Then, the selection circuit 44 outputs prediction image data PI corresponding to the smaller difference DIF of the difference DIF input from the intra prediction circuit 41 and the difference DIF input from the motion prediction/compensation circuit 58 to the calculation circuit 24.

Next, the calculation circuit 24 generates image data S24 indicating a difference between the image data S23 and the prediction image data PI input from the selection circuit 44 and outputs the same to the orthogonal transformation circuit 25.

Next, the orthogonal transformation circuit 25 performs orthogonal transformation, such as discrete cosine transformation and Karhunen-Loeve transformation, on the image data S24 to generate image data (for example a DCT coefficients) S25 and outputs the same to the quantization circuit 26.

Next, the quantization circuit 26 performs quantization on the image data S25 based on the quantization scale regulated in accordance with the quantization parameter QP based on the quantization parameter QP input from the rate control circuit 32, and outputs the same to the reversible coding circuit 27 and the inverse quantization circuit 29.

Next, the reversible coding circuit 27 stores in the buffer 28 the image data obtained by performing variable length coding or calculation coding on the image data S26.

As explained above, in the coding apparatus 2, when performing JVT coding on the image data S51 decoded in the MPEG2 decoding circuit 51, a quantization parameter QP (quantization scale) of each macro block used for quantization of the quantization circuit 26 based on the quantization scale Qm used for generating each macro block MBm of MPEG image data is determined.

Therefore, according to the coding apparatus 2, it is possible to perform high quality quantization with less waste in the JVT coding by considering characteristics of quantization in the MPEG coding comparing with the case of determining a quantization parameter QP to be used for quantization by the quantization circuit 26 without using a quantization scale Qm.

Also, according to the coding apparatus 2, as explained above, quantization scales Qa_t(i) and Qa_b(i) are generated based on the quantization scales Qm(i) and Qm(i+1) as shown in the above formulas (3) and (4) in the activity calculation circuit 53, and by determining a quantization scale to be used in the quantization circuit 26 based thereon, it is possible to prevent selecting an extremely larger or smaller quantization scale than the quantization scale used in the MPEG method coding in quantization in the JVT method coding.

Therefore, according to the coding apparatus 2, it is possible to perform suitable quantization in the quantization circuit 26 in terms of image quality and a coding efficiency. Namely, it is possible to prevent in the JVT coding a wasteful loss of information held in MPEG coding or assignment of an unnecessarily large amount of bits to information already lost in the MPEG coding.

Second Embodiment

In the above first embodiment, an explanation was made on the processing of the activity calculation circuit 53 shown in FIG. 2 in the case of performing field coding in unit of picture as shown in FIG. 6.

In the present embodiment, an explanation will be made on processing of the activity calculation circuit 53 shown in FIG. 2 when performing field coding in unit of micro block as shown in FIG. 7.

Figure 10:
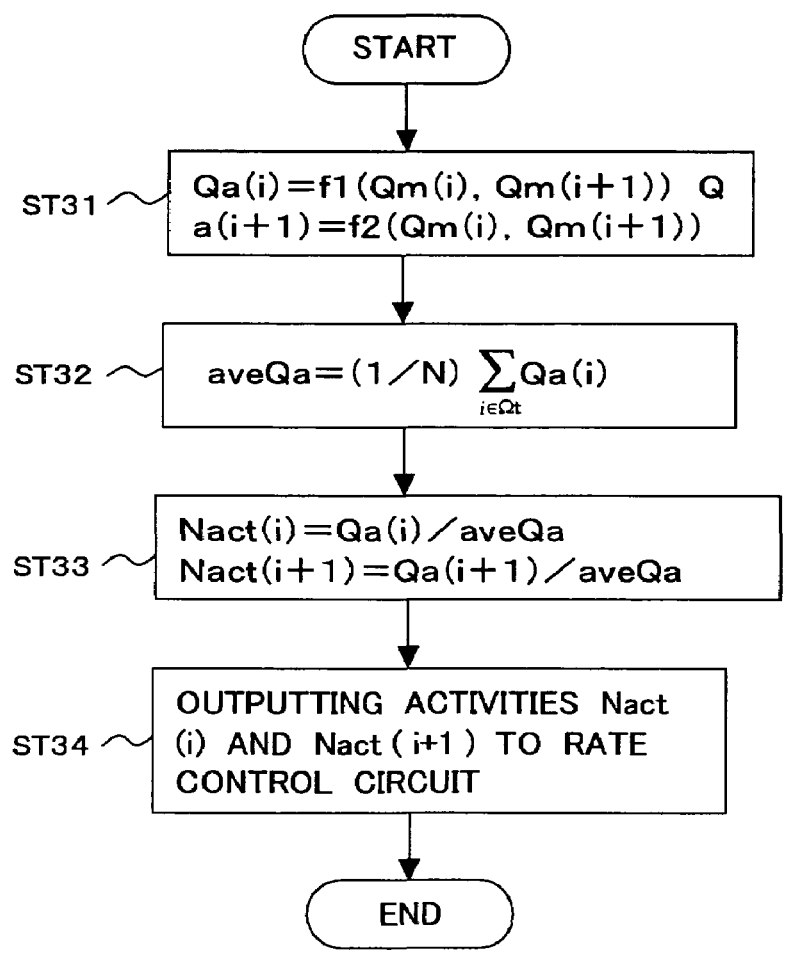
FIG. 10 is a flowchart for explaining processing of the activity calculation circuit shown in FIG. 2 when performing field coding in unit of macro block pair as shown in FIG. 7 in the coding apparatus 2 shown in FIG. 2.

FIG. 10 is a flowchart for explaining processing of the activity calculation circuit 53 show in FIG. 2 when performing field coding in unit of macro block as shown in FIG. 7.

Below, calculation of activity Nact of macro blocks MBj(i) and MBj(i+1) in JVT image data S2 shown in FIG. 7 will be explained as an example.

Step ST31:

The activity calculation circuit 53 receives as an input a quantization scale Qm(i) of the macro block MBm(i) and a quantization scale Qm(i+1) of the macro block MBm(i+1) shown in FIG. 6 from the MPEG2 decoding circuit 51.

The activity calculation circuit 53 receives as an input the quantization scales Qm(i) and Qm(i+1) as arguments of the function f1( ) shown in the formula (11) below and specifies a quantization scale Qa(i).

[Formula 11]

$$Qa(i)=f1(Qm(i),Qm(i+1)) \quad (11)$$

Also, the activity calculation circuit 53 receives as an input the quantization scales Qm(i) and Qm(i+1) as arguments of the function f2( ) shown in the formula (12) below and specifies a quantization scale Qa(i+1).

[Formula 12]

$$Qa(i+1)=f2(Qm(i),Qm(i+1)) \quad (12)$$

As the functions f1( ) and f2( ), for example, those as same as the above formulas (3) and (4) are used.

Step ST32:

The activity calculation circuit 53 calculates an average value aveQa of quantization scales Qa(i) and Qa(i+1) of all block data in the field FI_j, to which the macro blocks MBj(i) and MBj(i+1) belong, based on the formula (13) below.

[Formula 13] $\quad (13)$ $$aveQa = (1/N)\sum_{i\in\Omega} Qa(i)$$

Step ST33:

The activity calculation circuit 53 calculates an activity Nact(i) by dividing the quantization scale Qa(i) calculated in the step ST31 by the average value aveQa calculated in the step ST32 as shown in the formula (14) below.

[Formula 14]

$$Nact(i)=Qa(i)/aveQa \quad (14)$$

Also, the activity calculation circuit 53 calculates an activity Nact(i+1) by dividing the quantization scale Qa(i+1) calculated in the step ST41 by the average value aveQa calculated in the step ST32 as shown in the formula (15) below.

[Formula 15]

$$Nact(i+1)=Qa(i+1)aveQa \quad (15)$$

Step ST34:

The activity calculation circuit 53 outputs the activities Nact(i) and Nact(i+1) calculated in the step ST33 to the rate control circuit 54.

The same effects as those in the first embodiment can be obtained also in the present embodiment.

The present invention is not limited to the above embodiments.

For example, in the above embodiments, in the coding apparatus 2, the case of performing field coding by the JVT method was explained as an example, but frame coding may be performed.

In this case, for example, in the step ST12 shown in FIG. 8, the activity calculation circuit 53 calculates an average value aveQa of quantization scales Qa of all block data in the frame data, to which the macro block belongs, and based thereon, an activity Nact is generated.

Also, in the above embodiments, motion image data was explained as an example of data to be processed in the present invention, but data to be processed in the present invention may be still image data or audio data.

INDUSTRIAL APPLICABILITY

The present invention can be applied to coding systems for coding image data.

What is claimed is:

1. A data processing apparatus for performing a second quantization on data to be processed, the data to be processed obtained by performing inverse quantization after performing a first quantization by a first quantization scale, comprising:
   a quantization scale generation means for generating a second quantization scale Q(i) based on the first quantization scale for the data to be processed, the data to be processed corresponding to image data including blocks of data MBm(i) and MBm(i+1), and the first quantization scale including scales Qm(i) and Qm(i+1), wherein blocks MBm(i) and MBm(i+1) are subjected to the first quantization based on the first quantization scales Qm(i) and Qm(i+1); and
   a quantization means for performing the second quantization on the data to be processed based on the second quantization scale generated by the quantization scale generation means,
   wherein the quantization scale generation means calculates the second quantization scale Q(i) based on the scales Qm(i) and Qm(i+1), and calculates an additional second quantization scale Q(i+1), and
   wherein the quantization means performs the second quantization on the block data MBm(i) based on the second quantization scale Q(i) calculated by the quantization scale generation means and performs the second quantization on the block data MBm(i+1) based on the additional second quantization scale Q(i+1).

2. A data processing apparatus as set forth in claim 1, further comprising:
   a control means for generating first field data configured based on block data MBjt(i) obtained by performing the second quantization on the block data MBm(i), wherein the control means generates second field data to form a pair with the first field data, the second field data configured based on block data MBjb(i) obtained by performing the second quantization on the block data MBm(i+1).

3. A data processing apparatus as set forth in claim 1, further comprising:
   a control means for generating field data configured based on block data MBj(i) and MBj(i+1) obtained by performing the second quantization on the block data MBm(i) and MBm(i+1).

4. A data processing apparatus as set forth in claim 1, wherein the quantization scale generation means specifies a quantization scale Qa based on a predetermined function using the first quantization scales Qm(i) and Qm(i+1), and calculates the second quantization scales Q(i) and Q(i+1) based on the specified quantization scale Qa.

5. A data processing apparatus as set forth in claim 4, wherein the quantization scale generation means specifies the quantization scale Qa based on the function using the smaller of the first quantization scales Qm and Qm(i+1) as quantization scale Qa.

6. A data processing apparatus as set forth in claim 4, wherein the quantization scale generation means specifies the quantization scale Qa by calculating (Qm(i)+Qm(i+1)/2.

7. A data processing apparatus as set forth in claim 4, wherein the quantization scale generation means calculates an average value of quantization scales corresponding to the blocks of data, and calculates an activity value by dividing the quantization scale Qa of the block data to be processed by the average value, the second quantization scale of the block data to be processed being calculated based on the activity value.

8. The data processing apparatus as set forth in claim 1, wherein the blocks of data MBm(i) and MBm(i+1) correspond to two blocks of data having adjacent positions in the image data.

9. A data processing method for performing second quantization on data to be processed, the data to be processed obtained by performing inverse quantization after performing first quantization by a first quantization scale, the method comprising:
   generating a second quantization scale Q(i) based on the first quantization scale for the data to be processed, the data to be processed corresponding to image data including blocks of data MBm(i) and MBm(i+1), and the first quantization scale including scales Qm(i) and Qm(i+1), wherein blocks MBm(i) and MBm(i+1) are subjected to the first quantization based on the first quantization scales Qm(i) and Qm(i+1);
   performing the second quantization on the data to be processed based on the generated second quantization scale, wherein the second quantization scale Q(i) is calculated based on the scales Qm(i) and Qm(i+1);
   calculating an additional second quantization scale Q(i+1);
   performing the second quantization on the block data MBm(i) based on the second quantization scale Q(i); and
   performing the second quantization on the block data MBm(i+1) based on the additional quantization scale Q(i+1).

10. The data processing apparatus as set forth in claim 9, wherein the blocks of data MBm(i) and MBm(i+1) correspond to two blocks of data having adjacent positions in the image data.

11. A data processing method as set forth in claim 9, further comprising:
    generating first field data based on block data MBm(i), wherein the second field is generated data to form a pair with the first data field, the second field data configured based on block data MBjb(i) obtained by performing the second quantization on the block data MBm(i+1).

12. A data processing method as set forth in claim 9, further comprising:
    specifying a quantization scale Qa based on a predetermined function using the first quantization scales Qm(i) and Qm(1+1); and
    calculating the second quantization scales Q(1) and Q(1+1) based on the specified quantization scale Qa.

13. A data processing method as set forth in claim 12, wherein the quantization scale Qa is specified based on the function using the smaller of the first quantization scales Qm and Qm(i+1) as quantization scale Qa.

14. A data processing method as set forth in claim 12, wherein the quantization scale Qa is specified by calculating (Qm(i)+Qm(i+1)+1)/2.

15. A data processing method as set forth in claim 12, further comprising:
    calculating an average value of quantization scales corresponding to the blocks of data; and
    calcualating an activity value by dividing the quantization scale Qa of the block data to be processed by the average value, the second quantization scale of the block data to be processed being calculated based on the activity value.

16. A data processing method as set forth in claim 9, further comprising:
generating field data based on block data MBm(i) and MBj(i+1) obtained by performing the second quantization on the block data MBm(i) and MBm(i+1).

17. A coding apparatus, comprising:
a decoding means for generating decoded data by decoding coding data obtained by performing first quantization based on a first quantization scale including first quantization scales Qm(i) and Qm(i+1);
a quantization scale generation means for generating a second quantization scale based on the first quantization scale for the decoded data, the decoded data including blocks of data MBm(i) and MBm(i+1), wherein blocks MBm(i) and MBm(i+1) are subjected to the first quantization based on the first quantization scales Qm(i) and Qm(i+1); and
a quantization means for performing second quantization on the decoded data based on the second quantization scale generated by the quantization scale generation means,
wherein the quantization scale generation means calculates the second quantization scale Q(i) based on the scales Qm(i) and Qm(i+1), and calculates an additional second quantization scale Q(i+1), and
wherein the quantization means performs the second quantization on the block data MBm(i) based on the second quantization scale Q(i) calculated by the quantization scale generation means and performs the second quantization on the block data MBm(i+1) based on the additional second quantization scale Q(i+1).

18. A data processing apparatus for performing second quantization on data to be processed, the data to be processed obtained by performing inverse quantization after performing first quantization by a first quantization scale, comprising:
a quantization scale generation circuit for generating a second quantization scale Q(i) based on the first quantization scale for the data to be processed, the data to be processed corresponding to image data including blocks of data MBm(i) and MBm(i+1), and the first quantization scale including scales Qm(i) and Qm(i+1), wherein blocks MBm(i) and MBm(i+1) are subjected to the first quantization based on the first quantization scales Qm(i) and Qm(i+1); and
a quantization circuit for performing the second quantization on the data to be processed based on the second quantization scale generated by the quantization scale generation circuit,
wherein the quantization scale generation circuit calculates the second quantization scale Q(i) based on the scales Qm(i) and Qm(i+1), and calculates an additional second quantization scale Q(i+1), and
wherein the quantization circuit performs the second quantization on the block data MBm(i) based on the second quantization scale Q(i) calculated by the quantization scale generation circuit and performs the second quantization on the block data MBm(i+1) based on the additional second quantization scale Q(i+1).

* * * * *